(12) United States Patent
Jubinville et al.

(10) Patent No.: US 8,360,004 B2
(45) Date of Patent: Jan. 29, 2013

(54) EASY LOADING BALE FEEDER

(76) Inventors: Leonard Jubinville, Sturgeon County (CA); Brad Heath, Plainfield, WI (US)

(*) Notice: Subject to any disclaimer, the term of this patent is extended or adjusted under 35 U.S.C. 154(b) by 0 days.

(21) Appl. No.: 13/008,799

(22) Filed: Jan. 18, 2011

(65) Prior Publication Data

US 2011/0174225 A1 Jul. 21, 2011

(30) Foreign Application Priority Data

Jan. 19, 2010 (CA) .................... 2690358

(51) Int. Cl.
*A01K 1/10* (2006.01)
*A01K 5/00* (2006.01)
*A01K 5/01* (2006.01)
*A01K 39/00* (2006.01)

(52) U.S. Cl. .................. 119/61.1; 435/290.3
(58) Field of Classification Search ............ 119/58, 119/60, 61.2, 61.1
See application file for complete search history.

(56) References Cited

U.S. PATENT DOCUMENTS

| | | | | | |
|---|---|---|---|---|---|
| 655,504 | A | * | 8/1900 | Morris | 119/60 |
| 741,175 | A | * | 10/1903 | Shutss | 119/61.4 |
| 1,028,445 | A | * | 6/1912 | Dewey | 119/61.3 |
| 1,032,747 | A | * | 7/1912 | Evans | 119/522 |
| 1,269,827 | A | * | 6/1918 | Lewis et al. | 119/58 |
| 1,447,562 | A | * | 3/1923 | Mattson et al. | 119/63 |
| 1,495,908 | A | * | 5/1924 | Kidwell | 119/60 |
| 2,713,321 | A | * | 7/1955 | Keen | 119/672 |
| 2,798,457 | A | * | 7/1957 | Seward | 119/51.01 |
| 3,400,688 | A | * | 9/1968 | Koinzan | 119/51.01 |
| 4,303,040 | A | * | 12/1981 | Mann | 119/62 |
| 4,687,645 | A | * | 8/1987 | Harvey | 435/290.3 |
| 5,000,122 | A | * | 3/1991 | Smith | 119/58 |
| 5,003,926 | A | * | 4/1991 | Bratrud | 119/62 |
| 5,421,290 | A | * | 6/1995 | Welch | 119/51.11 |
| 5,589,391 | A | * | 12/1996 | Fink | 435/290.3 |
| 5,908,007 | A | * | 6/1999 | Duin | 119/51.11 |
| 6,209,489 | B1 | * | 4/2001 | Akins | 119/61.4 |
| 6,497,196 | B1 | * | 12/2002 | Helton | 119/60 |
| 7,611,891 | B2 | * | 11/2009 | Sundberg | 435/290.3 |
| 7,625,749 | B2 | * | 12/2009 | Sundberg | 435/290.3 |
| 2006/0272587 | A1 | * | 12/2006 | Gordon | 119/61.1 |

OTHER PUBLICATIONS

Joe Laur; Spin the Barrel—Making a Rotating Barrel Composter; <http://greenopolis.com/goblog/joe-laur/spin-barrel-making-rotating-barrel-composter>; Nov. 6, 2009.*

* cited by examiner

*Primary Examiner* — Monica Williams
*Assistant Examiner* — Michael A Fabula
(74) *Attorney, Agent, or Firm* — Christensen O'Connor Johnson Kindness PLLC

(57) ABSTRACT

A bale feeder includes a support and a housing pivotally mounted to the support. The housing has a peripheral sidewall defining a bale receiving interior cavity with an access opening providing access to the interior cavity. The housing is pivotally movable between a loading position and a feeding position. In the loading position the access opening is substantially horizontal for improved loading access.

9 Claims, 6 Drawing Sheets

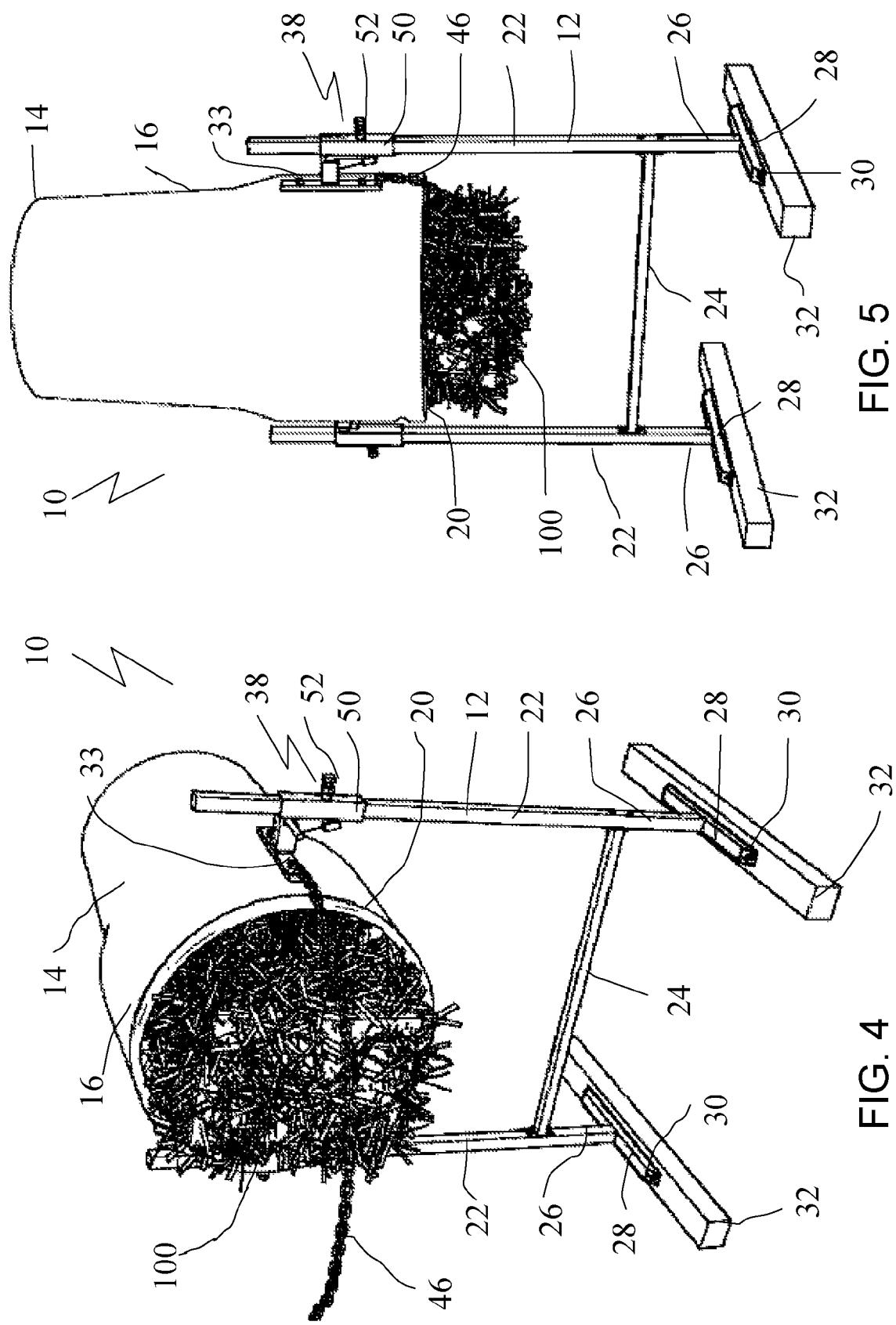

EASY LOADING BALE FEEDER

FIELD

There is described a bale feeder that is easier to load bales into.

BACKGROUND

There are numerous configurations of bale feeder which are commercially available. A disadvantage with many of these configurations is that it is physically demanding to load bales into the bale feeder. What is required is a bale feeder that is easier to load.

SUMMARY

There is provided a bale feeder which includes a support and a housing pivotally mounted to the support. The housing has a peripheral sidewall defining a bale receiving interior cavity with an access opening providing access to the interior cavity. The housing is pivotally movable between a loading position and a feeding position. In the loading position the access opening is substantially horizontal for improved loading access.

In order to make it easy to load the bale feeder, the housing in which the bale is retained is pivotally movable between the loading position and the feeding position. In the loading position, the access opening is pivoted to a more accessible horizontal position.

As will hereinafter be further described, it is preferred that the housing is in the form of a barrel that encloses all of the bale except that portion that protrudes from the access opening and protects the bale from environmental spoilage due to sun and rain.

As will hereinafter be further described, it is preferred that the access opening be oriented downwardly when in the feeding position so that the bale is gravity fed toward the access opening. A bale retainer is positioned at the access opening to retain the bale when the housing is in the downwardly oriented feeding position. A preferred form of bale retainer is an elongated flexible member that extends across the access opening to retain the bale but does not otherwise obstruct the access opening.

For simplicity of design, it is preferred that the housing be biased toward one of the loading position or the feeding position and that a housing lock be provided to lock the housing to the support in the other of the loading position or the feeding position.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 4 is a perspective view of the easy loading bale feeder of FIG. 2, with bale fully loaded.

FIG. 5 is a side elevation view of the easy loading bale feeder of FIG. 1 in the feeding position with a bale.

DETAILED DESCRIPTION

Figure 1:
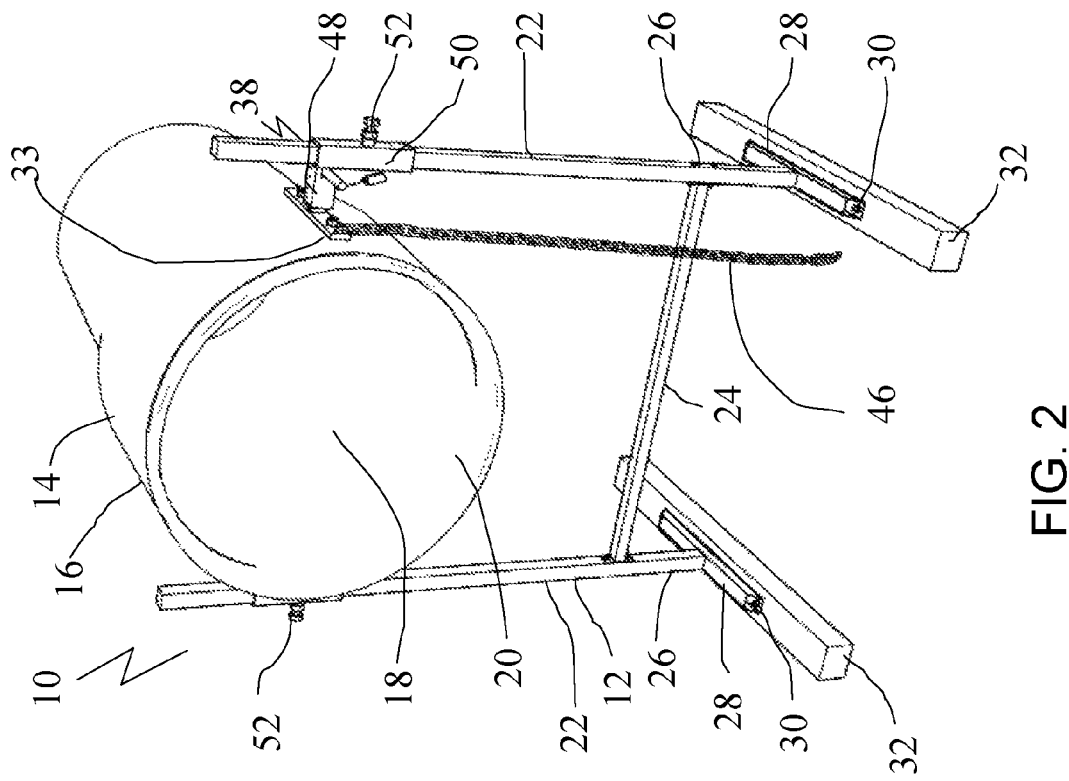
FIG. 1 is a front elevation view of an easy loading bale feeder in the feeding position without a bale.

An easy loading bale feeder generally identified by reference numeral 10, will now be described with reference to FIG. 1 through 8.

Figure 2:
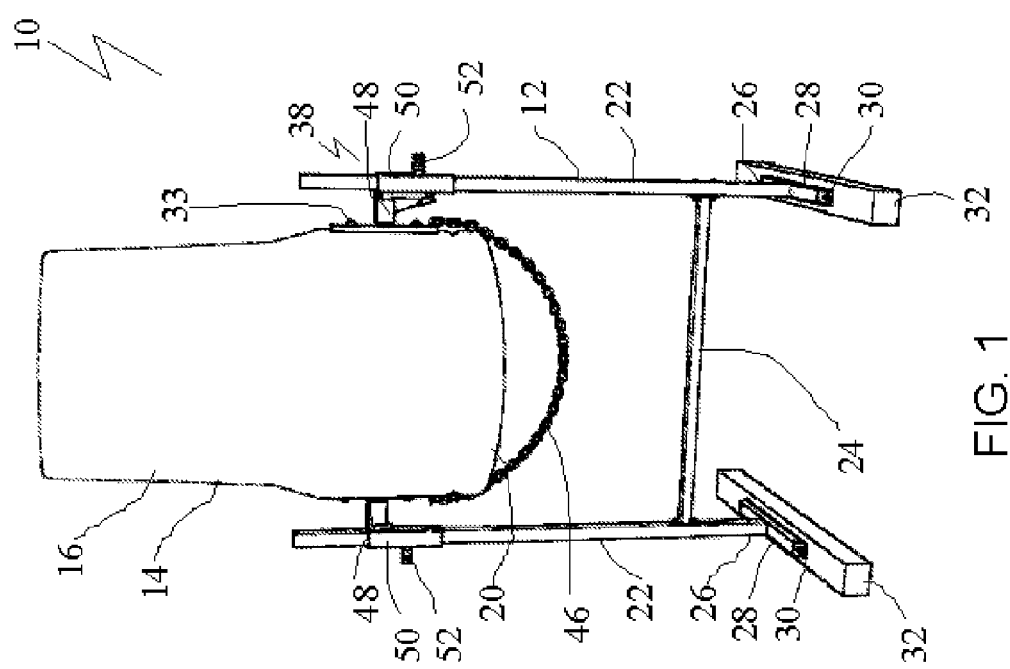
FIG. 2 is a perspective view of the easy loading bale feeder of FIG. 1 in the loading position.

Referring to FIG. 1 and FIG. 2, in its most basic form bale feeder 10 includes a support 12 and a housing 14 pivotally mounted to support 12. Housing 14 has a peripheral sidewall 16 defining a bale receiving interior cavity 18 with an access opening 20 providing access to interior cavity 18. Housing 14 is pivotally movable between a loading position illustrated in FIG. 2 and a feeding position illustrated in FIG. 1. In the loading position, access 20 opening is substantially horizontal for improved loading access. Support 12 and housing 14 can be built in a number of different configurations once the basic teachings of the invention are understood.

Structure and Relationship of Parts:

Referring to FIG. 1 and FIG. 2, in the illustrated embodiment, support 12 is in the form of a support frame. Support frame 12 consists of a pair of vertical members 22 that are held in spaced relation by a detachable spacer bar 24. Each vertical member 22 has a lower end 26 onto which been welded a mounting bar 28. Each mounting bar 28 is intended to be mounted by fasteners 30 to some form of base. In the illustrated embodiment, wooden rails 32 have been used. It will be apparent that mounting bar 28 could be mounted to a wooden frame or deck, a concrete slab, or any other form of stabilizing base.

In the illustrated embodiment, housing 14 is in the form a bucket or barrel. Referring to FIG. 5, barrel housing 14 provides an advantage in that it encloses all of a bale 100, except that portion of bale 100 that protrudes from access opening 20. This serves to protect bale 100 from environmental damage due to sun and rain.

Figure 6:
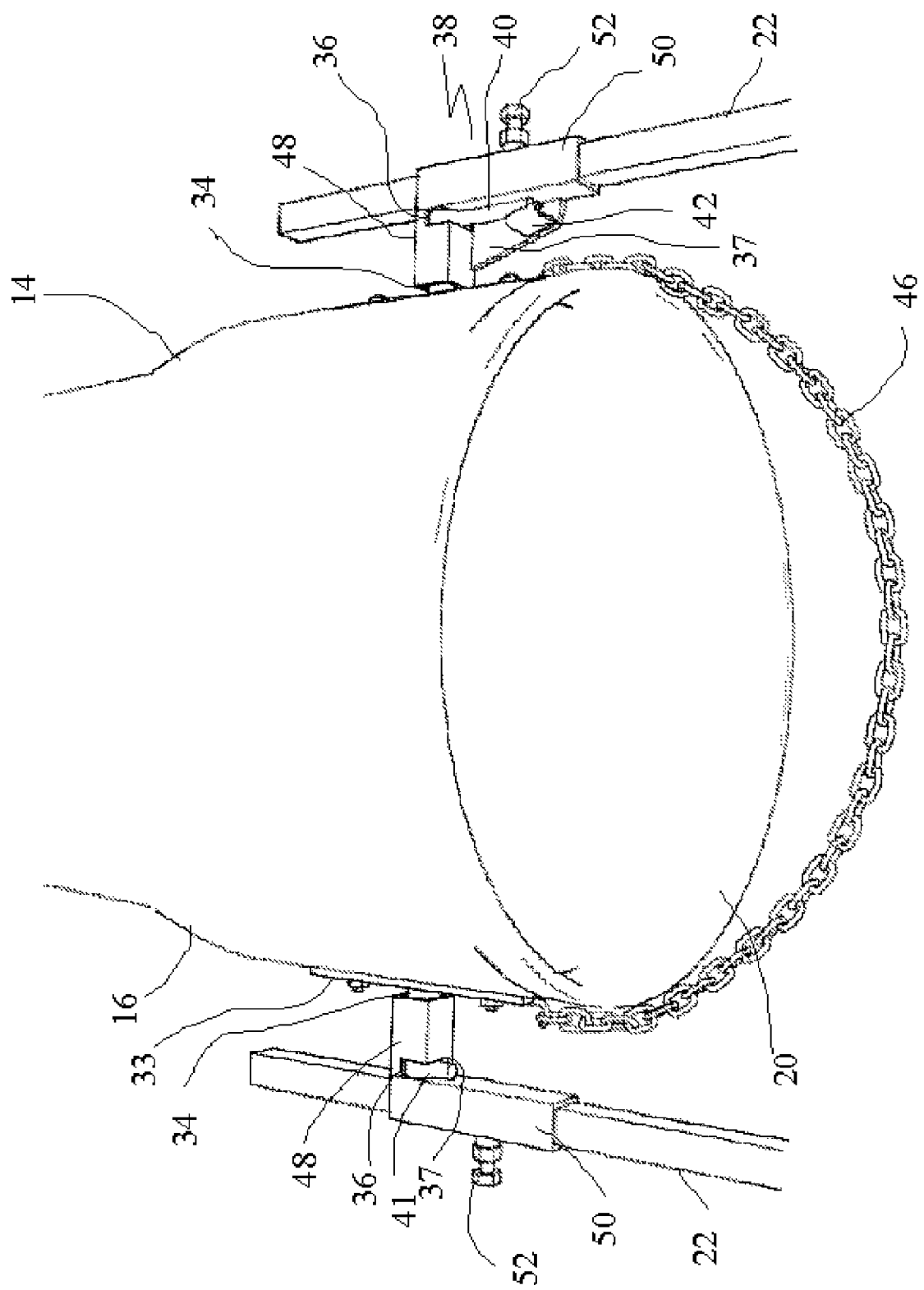
FIG. 6 is a detailed front elevation view of a housing lock on the easy loading bale feeder of FIG. 1, with the housing lock in the locked position.
Figure 7:
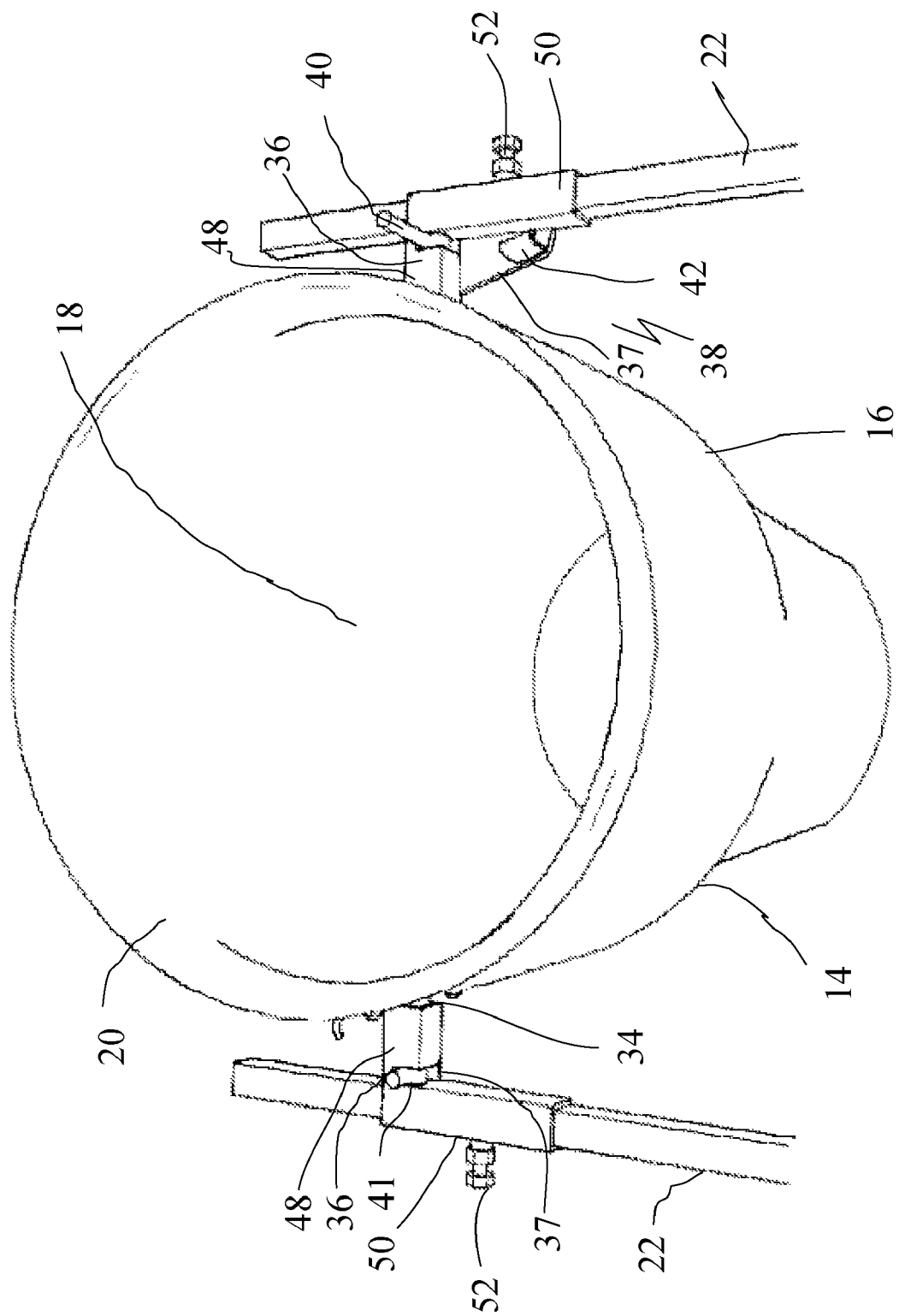
FIG. 7 is a detailed front elevation view of the housing lock illustrated in FIG. 6, with the housing lock in the unlocked position.

Referring to FIG. 6, barrel housing 14 has a pivot axis defined by outwardly extending rotatable stub shafts 34. Stub shafts 34 are positioned immediately adjacent to access opening 20 and are secured to barrel housing by brackets 33. Stub shafts 34 of barrel housing 14 pivot in shaft receptacles 48 that are mounted to support frames 12. This positioning leaves a majority of barrel housing 14 above the pivot axis provided by stub shafts 34. This serves to bias barrel housing 14 by force of gravity into the horizontal loading position. Referring to FIGS. 6 and 7, a housing lock, generally indicated by reference numeral 38 is used to lock the barrel housing 14 in the feeding position. Housing lock 38 includes a radial arm 40 extending radially from one of stub shafts 34. An arm receiver 42 is fixedly secured to support frame 12. Arm receiver 42 engages radial arm 40 to lock barrel housing 14 into the feeding position. A second radial arm 41 extends radially from the other stub shaft 34. When it is desired to move barrel housing 14 to the loading position, radial arm 40 is disengaged from arm receiver 42 enabling barrel housing to move by force of gravity to the loading position. Rotational stops 36 and 37 are provided to prevent barrel housing 14 from over rotating by stopping rotational movement of each radial arm 40 and 41. As shown, rotational stops 36 and 37 are provided in shaft receptacles 48, with arms 40 and 41 pivoting between stops 36 and 37. It will be understood that in another embodiment, stub shafts 34 may be non-rotatably mounted to support frame 12 with shaft receptacles rotatably mounted to housing 14. Other pivoting arrangements will also be apparent to those skilled in the art.

Referring to FIG. 5, it is preferred that access opening 20 be oriented downwardly when in the feeding position. This results in bale 100 moving by force of gravity toward access opening 20. In order to ensure that bale 100 does not fall out of access opening 20 a bale retainer 46 is provided. Referring to FIG. 4, a preferred form of bale retainer 46 is an elongated flexible member (a chain is illustrated) that extends across access opening 20 to retain bale 100, but not otherwise obstruct access opening 20. An advantage of this form of bale retainer is that it can be readily adjusted to expose more or less of the bale depending upon the weather conditions and the animals being fed.

Figure 8:
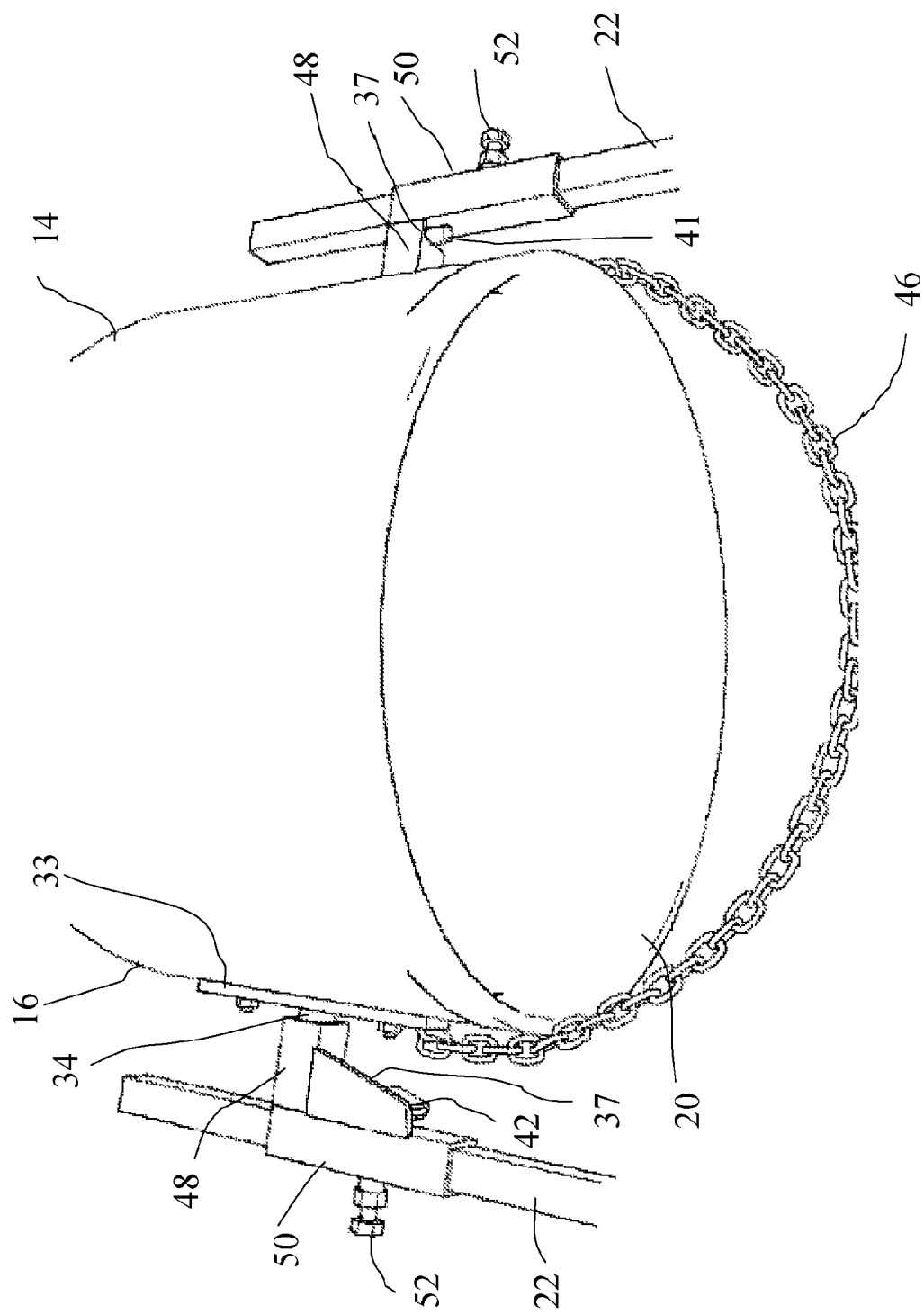
FIG. 8 is a detailed rear elevation view of the housing lock illustrated in FIG. 6.

Referring to FIG. 1 and FIG. 8, vertical members 22 of support frame 12 provide a track. Shaft receptacles 48 are mounted to sleeves 50 that serve as track engaging members. Sleeves 50 slide over and are movable along vertical members 22. A screw clamp lock 52 is provided to lock sleeves 50 in place in a selected position along vertical members 22. Although this provides some means of height adjustment, it also facilitates shipping. By releasing screw clamp locks 52, sleeves 50 can be slid free of vertical members 22. Then by detaching spacer bar 24, support frame 12 can be collapsed for shipping.

Figure 3:
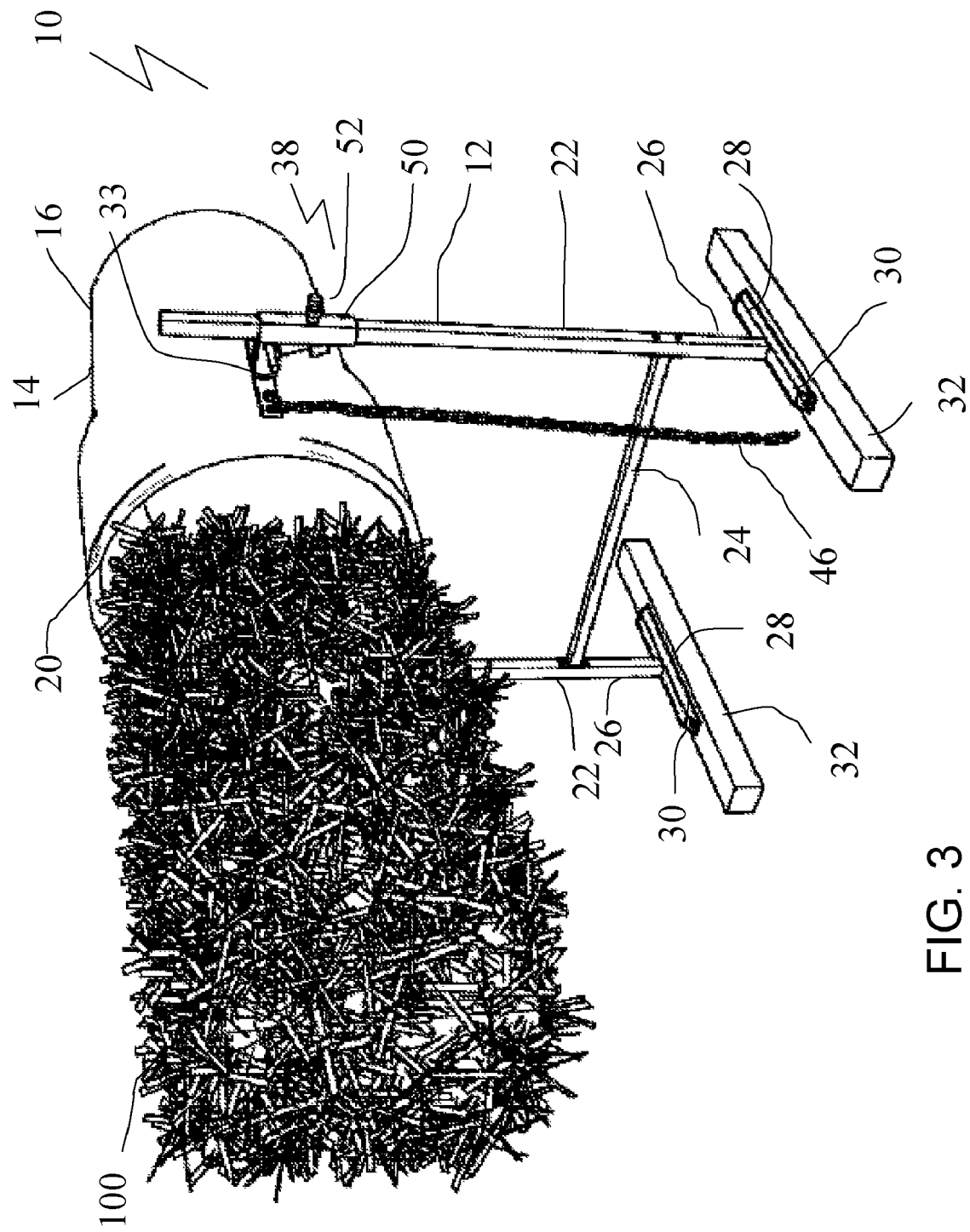
FIG. 3 is a perspective view of the easy loading bale feeder of FIG. 2, with bale being loaded.

Operation:

The use and operation of easy loading bale feeder 10 will now be described with reference to FIG. 1 through FIG. 8. Referring to FIG. 1, it will be assumed that bale feeder 10 has been in use and is now empty and sitting in the feeding position. Referring to FIGS. 6 and 7, in order to move from the feeding position to the loading position, housing lock 38 must be released. First radial arm 40 is disengaged from arm receiver 42 enabling barrel housing 14 to move by force of gravity to the loading position illustrated in FIG. 2. Referring to FIG. 6, rotational stops 36 and 37 prevents barrel housing 14 from over rotating. Referring to FIG. 3 and FIG. 4, bale 100 is inserted through access opening 20 into bale receiving interior cavity 18 of barrel housing 14. Referring to FIG. 4, bale retainer 46 (the chain) is positioned across access opening 20 to retain bale 100. Referring to FIG. 5, barrel housing 14 is manually rotated from the loading position back into the feeding position. Referring to FIGS. 6 and 7, housing lock 38 is engaged to lock barrel housing 14 in the feeding position. This is accomplished by pivoting radial arm 40 towards rotational stop 37 and engaging radial arm 40 with arm receiver 42. It will be noted that a portion of bale 100 hangs out of access opening 20, where it is accessible to animals wishing to feed. It will also be noted that a majority of bale 100 is sheltered from the elements within barrel housing 14.

Variations:

It will be appreciated by a person skilled in the art that support 12 can differ from that which has been illustrated. Support 12 can be mounted to a wall or ceiling of a building. Support 12 can be configured to mount over or onto a side of a fence post. It will also be appreciated by a person skilled in the art that the loading position and the feeding positions can vary from what has been shown. The loading position can be at any angle that allows ease of access for loading and the feeding position can be at any angle that allows ease of access for feeding. Although the loading position and the feeding position will always be different positions. The same position will not be used for both feeding and loading. It will finally be appreciated by a person skilled in the art that the bale retainer can take other forms. For example, a rod would perform the intended function.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A bale feeder, comprising:
   a support having a pivot axis positioned relative to a ground surface;
   a housing having a peripheral sidewall defining an elongated bale receiving interior cavity with an access opening providing access to the interior cavity, wherein the housing is configured to enclose all of a bale positioned within the interior cavity except for a portion that protrudes from the access opening in order to protect the bale from environmental spoilage due to sun and rain, the housing being pivotally supported by the support for movement between a loading position and a feeding position, wherein the loading position is substantially horizontal with respect to the ground surface and the feeding position is substantially vertical with respect to the ground surface, and wherein the interior cavity has a longitudinal axis that is perpendicular to the pivot axis of the support; and
   an elongated bale retainer positioned at the access opening to retain the bale when the housing is in the feeding position, wherein the bale retainer is connected to a periphery of the access opening and is configured to extend across the access opening and connect to an opposite periphery of the access opening, and wherein, when the bale retainer is connected to the opposite periphery of the access opening, the bale retainer retains the bale within the housing while leaving portions of the access opening unobstructed to provide animals with access to the bale for feeding;
   wherein, when the housing is in the feeding position, the longitudinal axis of the interior cavity is oriented vertically with respect to the ground surface, with the access opening being oriented downwardly toward the ground surface to allow a bale in the interior cavity to be gravity fed toward the bale retainer;
   wherein, when the housing is in the loading position, the longitudinal axis of the interior cavity is oriented horizontally with respect to the ground surface, with the access opening being oriented substantially horizontally for improved loading access;
   wherein the housing is stoppable in the loading position to stabilize the housing during loading of a bale; and
   wherein the housing is lockable in the feeding position to stabilize the housing during feeding.

2. The bale feeder of claim 1, wherein the housing is a barrel.

3. The bale feeder of claim 1, wherein the bale retainer is an elongated flexible member that extends across the access opening to retain the bale but does not otherwise obstruct the access opening.

4. The bale feeder of claim 1, wherein the support is a frame having spaced apart vertical members.

5. The bale feeder of claim 4, wherein the frame is mounted on at least one stabilizing base member.

6. The bale feeder of claim 5, wherein the vertical members of the support frame provide a track and the housing is pivotally mounted to track engaging members which are movable along the vertical members, a lock being provided to lock the track engaging members in a selected position to the vertical members.

7. A bale feeder, comprising:
a support frame having a pivot axis positioned relative to a ground surface;
a barrel housing having a peripheral sidewall defining a bale receiving interior cavity configured to enclose all of a bale positioned in the interior cavity to protect the bale from environmental damage due to sun and rain, except for a portion of the bale that protrudes from an access opening, the access opening providing access to the interior cavity, the housing being pivotally supported by the support frame for movement between a substantially horizontal loading position and a substantially vertical feeding position, the interior cavity having a longitudinal axis that is perpendicular to the pivot axis of the support frame;
wherein, when the housing is in the loading position, the longitudinal axis of the interior cavity is oriented horizontally with respect to the ground surface, with the access opening being oriented substantially horizontally for improved loading access, the support frame having a stop and the housing being biased toward the stop when the housing is in the loading position;
a housing lock configured to lock the housing to the support frame when the housing is in the feeding position; and
an elongated bale retainer positioned at the access opening to retain a bale when the housing is in the feeding position, wherein the bale retainer is connected to a periphery of the access opening and extends across the access opening to connect to an opposite periphery of the access opening and thereby retain the bale in the interior cavity without otherwise obstructing the access opening,
wherein, when the housing is in the feeding position, the longitudinal axis of the interior cavity is oriented vertically with respect to the ground surface, with the access opening being oriented downwardly toward the ground surface to allow a bale in the interior cavity to be gravity fed toward the bale retainer.

8. The bale feeder of claim 7, wherein the housing has outwardly extending rotatable stub shafts, and wherein the housing lock includes a radial arm extending radially from at least one of the stub shafts and an arm receiver secured to the support frame, the arm receiver engaging the radial arm when the barrel housing is in the feeding position.

9. The bale feeder of claim 7, wherein the support frame has vertical members that provide a track, and wherein the housing is pivotally mounted to track engaging members that are movable along the vertical members, a screw clamp lock being provided to lock the track engaging members in a selected position to the vertical members.

\* \* \* \* \*